United States Patent Office 3,363,067
Patented Jan. 9, 1968

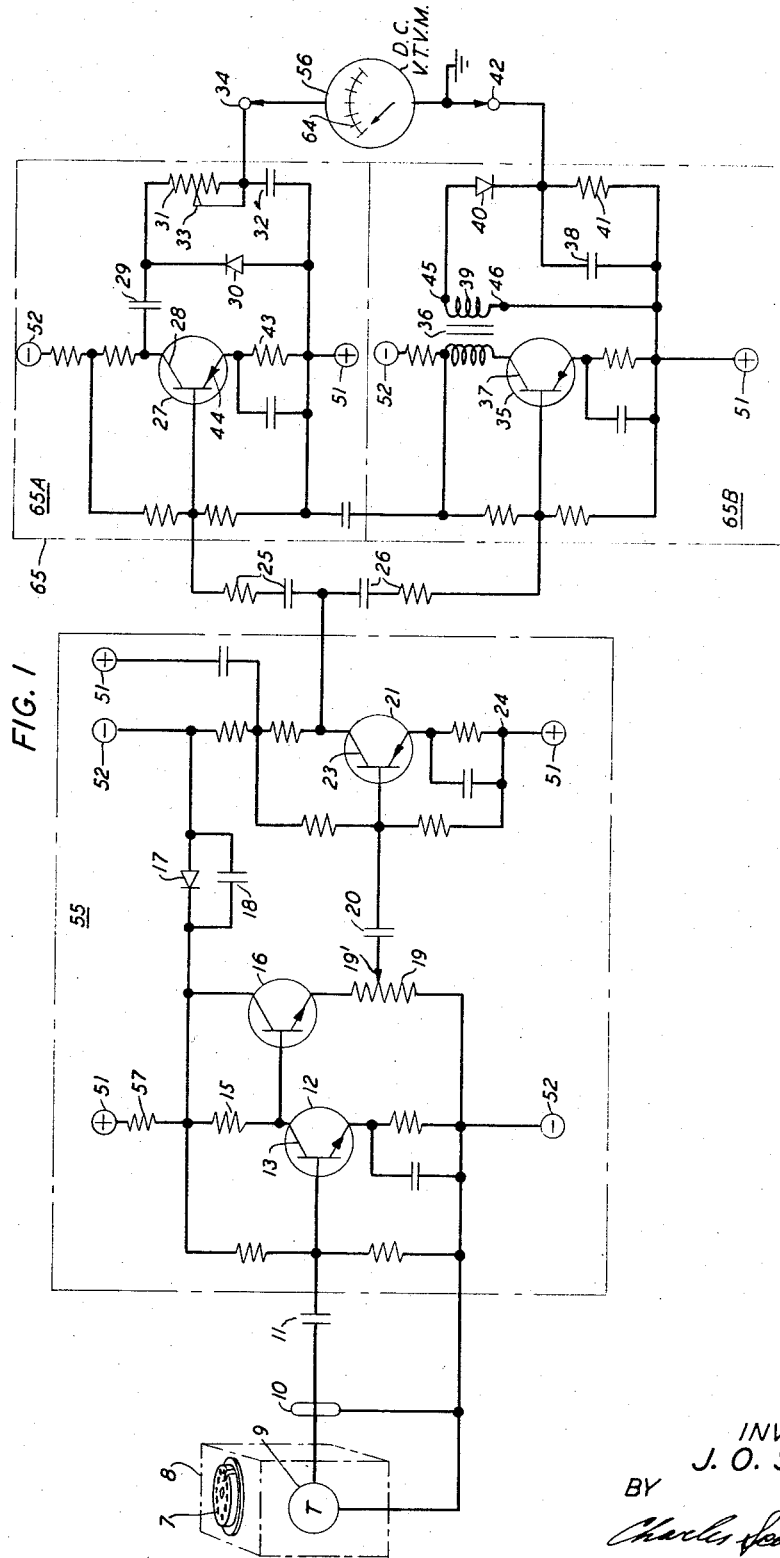

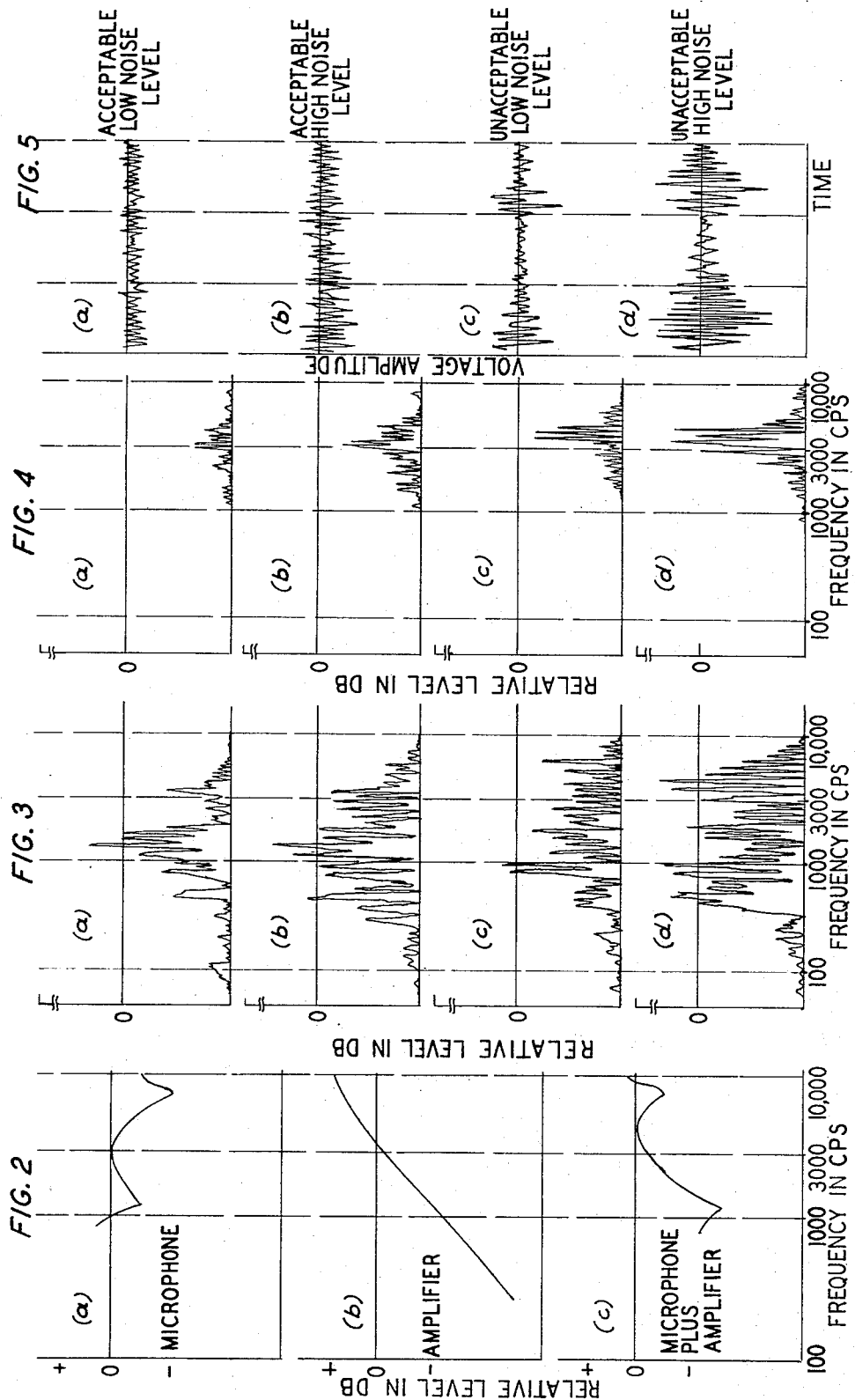

3,363,067
DIAL NOISE TEST SET
John O. Seaver, Menlo Park, N.J., assignor to Bell Telephone Laboratories, Incorporated, New York, N.Y., a corporation of New York
Filed Dec. 31, 1964, Ser. No. 422,593
12 Claims. (Cl. 179—175.1)

This invention is a noise test set of a particular type that discriminates between subjectively acceptable and unacceptable noises.

Present methods used to measure noise fall into categories such as mechanical, electrical, and electronic. These methods have been developed primarily for use in laboratory situations where usage is specialized. The type of equipment generally used for the measurement of noise is delicate, complicated, cumbersome, very accurate, and expensive. Another type of equipment which measures noise simply and inexpensively is the stethoscopic type. This type has an inherent disadvantage of providing inconsistent results because it relies upon human hearing for signal measurement. Human hearing varies widely in characteristics from person to person and will therefore seriously complicate data collected by unskilled personnel.

There exists a need for a simple inexpensive noise testing procedure to provide consistent results when utilized for rapid tests in a rugged environment by relatively unskilled personnel. Such circumstances may be readily found in manufacturing operations, maintenance and repair operations, and other work operations of various types.

Therefore, it is an object of the invention to simplify mechanical noise testing so that unskilled personnel may accomplish such tests with rapidity and accuracy.

Another object is the segregation of unacceptably noisy mechanisms from acceptable mechanisms easily and inexpensively.

A further object is to segregate signals with amplitude-frequency characteristics that have similar levels in one frequency band and different levels in another frequency band.

These and other objects of the invention are realized in an illustrative embodiment thereof which is a telephone dial noise test set. Circuitry within the set compares the average value with the peak value of mechanically generated noise signals which are acoustically and electrically coupled into the set from a rotating telephone dial. The test set displays a difference measurement resulting from a comparison of the average value with the peak value. This display is calibrated so that personnel operating such a test set can readily segregate unacceptably noisy mechanisms from acceptable mechanisms.

A feature of the invention is a means to segregate a diversity of input signals into categories by comparison of the peak envelope amplitude to the average envelope amplitude of individual input signals and the measurement and display of amplitude difference values.

Another feature is a means to segregate acceptable mechanisms from unacceptably noisy mechanisms by converting their mechanically generated noise to electrical signals, emphasizing the amplitude of a selected range of frequencies in the noise signal, comparing the peak envelope amplitude and the average amplitude of such emphasized signals, and measuring and displaying the amplitude difference value.

A better understanding of the invention may be derived from the detailed description following if that description is considered with respect to the attached drawings in which:

FIG. 1 is a schematic diagram of a test set illustrative of the invention;

FIG. 2 is a graphical chart which shows individual and combined amplitude-frequency characteristics of a microphone and an amplification network used in the test set; and FIGS. 3, 4 and 5 are key waveform characteristics which illustrate typical wave shapes of a diversity of signals progressing through the test set.

Herein described is a noise test set which segregates unacceptably noisy mechanisms from acceptable mechanisms by distinguishing between characteristic differences in mechanical noise signals generated by the two categories of mechanisms.

Standard telephone dials include rotatable mechanisms which are tested in the particular test set illustrated herein. These dial mechanisms are operated and resulting noise is measured by this test set to isolate that portion of the dials which is in need of mechanical adjustment and repair from a large group of dials containing all possible rotational noise characteristics.

The categories of "objectionably noisy" and "acceptable" mechanisms have been established through subjective tests performed by a number of persons on a group of mechanisms. In the subjective tests rotating dials were classified into the specified categories by persons making simple listening tests. The results of these subjective tests have been studied to determine an objective test procedure that will consistently separate these categories. Noise level alone was found to be an inadequate test. Even though high noise level is in general objectionable and low noise level is in general acceptable, some high noise level mechanisms have been found to fall into the acceptable category and some low noise level mechanisms fall into the objectionably noisy category.

Careful study of the noise characteristics of telephone dial mechanisms shows that the studied noise signals have similar characteristics for a low frequency band and have different characteristics for a higher frequency band. Objectionably noisy mechanisms of such types have greater noise energy than do acceptable mechanisms in the higher frequency band. The test set emphasizes the noise signal energy in the higher frequency band and thereby facilitates separation of mechanisms by a detection circuit that depends upon signal frequency and amplitude for its operation. The emphasized signals of objectionably noisy mechanisms have an amplitude-time envelope characteristic which includes substantial peaks and valleys. Acceptable mechanisms have an emphasized signal envelope characteristic which has a substantially constant amplitude relative to time.

Referring to FIG. 1, a standard telephone dial mechanism 7 is placed into a suitable acoustical chamber 8 such that the dial mechanism 7 is acoustically coupled to a microphone 9 positioned within the chamber 8 to be in close proximity to the dial mechanism 7. Then the dial is wound clockwise through a predetermined arc and released. As the dial rotates under its own power it generates mechanical noises resulting from meshing gears, wobbling parts, unbalance, friction, and looseness. These noises are transmitted throughout the dial mechanism and are acoustically coupled into the microphone 9. This microphone acts as a transducer to convert fluid pressure undulations representing dial noise into electrical signal variation.

The microphone 9 inherently distorts transmitted signals such that a substantially level input across a frequency band from approximately 1000 cycles per second to approximately 10,000 cycles per second will produce an output similar to the characteristic shown in FIG. 2(a). The combination of chamber 8 and microphone 9 converts mechanical noise generated by the rotating dial mechanism 7 from acoustical energy into an electrical signal. This signal is introduced into an amplifier 55 within the test set. The amplifier 55 is designed to provide a differential gain characteristic in the frequency range of interest as in FIG. 2(b) by use of a low frequency cut off of approximately 10,000 cycles per second. This characteristic shown in FIG. 2(b) is the output of amplifier 55 resulting from an input with a characteristic of the same type as the one for the microphone given above. The zero decibel reference level used for the relative decibel scale in FIG. 2 is the peak output level of the combined microphone and amplifier in a frequency band of interest with a uniform input signal at all frequencies in the band. The combined output characteristic of the microphone 9 and the amplifier 55 is shown in FIG. 2(c). This combined characteristic provides emphasis, or higher gain, for signals in the frequency band of interest between approximately 3000 cycles per second and approximately 6000 cycles per second relative to signals below approximately 3000 cycles per second.

FIGS. 3 through 5 show the waveforms of spectral distribution and resulting test set signals for four typical subjectively classified dial mechanism noises. The classifications for all three figures are indicated by labels to the right of the FIG. 5 waveforms. The waveforms of FIG. 3 indicate the distribution of noise energy in decibels relative to frequency. FIGS. 3(a) and (b) are samples of noise from acceptable mechanisms, (a) for low level noise and (b) for high level noise. FIGS. 3(c) and (d) are samples of noise from unacceptable mechanisms, (c) for low level noise and (d) for high level noise. Although there are variations in energy distribution below 3000 cycles per second the variations are insufficient for purposes of category distinction. There are, however, sufficient differences in noise energy between acceptable and unacceptable mechanisms in the 3000 cycles per second to 10,000 cycles per second frequency band. These energy differences in the higher frequency band of interest are emphasized by significantly higher gain provided for this band in the microphone 9 and amplifier 55 combination.

The microphone 9 is electrically connected in series with a shielded cable 10 and a coupling capacitor 11 in the base-emitter circuit of a transistor 12 which is connected in a common-emitter amplifier stage. The coupling capacitor 11 and other coupling impedances of amplifier 55 are assigned values to establish the low frequency cutoff of amplifier 55 at approximately 10,000 cycles per second, the upper frequency of interest as shown in FIG. 2(b). Amplifier 55 includes three transistor amplifier stages of types which are generally well known in the art. The transistors in these stages as well as all other stages in the test set are biased to conduct in the absence of signals and to operate in the linear portion of their characteristics in the presence of signals. The description herein of the amplifier is limited to circuit details and functions which are of particular interest in the overall operation of the test set.

The output of the common-emitter amplifier stage is taken at collector electrode 1. The circuit of transistor 12 has a low input impedance to reduce a possibility of introduction of circuit noise. A collector circuit resistor 15 has a high value so that collector to emitter voltage is low, noise factor is low, and voltage gain is enhanced. The collector output electrode 13 is directly connected to a base input electrode of transistor 16. Transistor 16 is connected in a common-collector stage with high input impedance and low output impedance. The collector electrode of transistor 16 is connected through capacitor 18 to a power supply terminal 52. A reverse breakdown diode 17 in conjunction with resistor 57 stabilizes the voltage supply for transistors 12 and 16. The indicated positive terminals 51 and negative terminals 52 throughout the circuit of FIG. 1 represent the positive and negative polarity terminals of a non-grounded direct current power supply of suitable value. An emitter-load potentiometer 19 has a tap 19' to set a nominal average signal value at output terminal 42 of the test set output for an input reference signal. Capacitor 20 couples tap 19' to the base of transistor 21 and is assigned to low value to contribute to the amplifier 55 low frequency cutoff. Transistor 21 is arranged in a common-emitter amplifier stage to provide a high input impedance in order to enhance coupling from the previous common-collector circuit. The output of transistor 21 is taken from collector electrode 23.

Typical signal energy spectra of the electrical representation of mechanically generated noise from telephone dial mechanisms, as modified by the microphone and amplifier combination, have been recorded. For that purpose measurements were made between collector electrode 23 and terminal 24. These typical spectra are shown in FIG. 4. The waveforms (a), (b), (c) and (d) of FIG. 4 correspond to the waveforms (a), (b), (c), and (d) in FIG. 3. That is, FIGS. 4(a) and (b) show acceptable mechanical noise for low and high noise level mechanisms, and FIGS. 4(c) and (d) show emphasized unacceptable mechanical noise for low and high noise level mechanism. A comparison of each part of FIG. 3 with its counterpart of FIG. 4 is suggested so that the reader may note the significant modification of the energy spectrum that makes possible segregation of the acceptable and unacceptable mechanisms in subsequent comparator circuitry.

An essential difference between the signals shown in FIGS. 4(a) and (b) and those shown in FIGS. 4(c) and (d) can be more readily recognized by additionally considering FIGS. 5(a), (b), (c), and (d). Voltage versus time plots shown in FIG. 5 are waveforms of the same output signals which produced the waveforms in FIG. 4. FIGS. 5(a) and (b) show that acceptable mechanism noise signals, whether high or low level, fluctuate with essentially constant amplitude swings. On the other hand, FIGS. 5(c) and (d) show that unacceptable mechanism noise signals, whether high or low level, fluctuate in a pattern having noticeable envelope peaks and valleys. It is therefore possible to distinguish between these two types of waveform by using a two part comparator circuit 65 in which one part responds to the peak value of the waveform envelope and another part responds to the average value of the waveform envelope.

The output of amplifier 55 is taken from collector electrode 23 and is connected to the input of the comparator circuit 65 through a pair of similar series resistance and capacitance coupling circuits 25 and 26 in a multiple arrangement. The capacitors are assigned values related to estblishment of the low frequency cutoff of amplifier 55 as previously mentioned, and the resistors maintain a maximum of avaialble high frequency signal and prevent overdrive in subsequent stages. Comparator circuit 65 includes a peak direction circuit 65A and an average detection circuit 65B. Transistors 27 and 35 are arranged in similar common-emitter amplifier stages that provide final gain prior to comparison of the signal waveform characteristics.

An output collector electrode 28 of transistor 27 is connected in a series loop with a peak signal detection circuit. In the peak detection circuit a capacitor 29 is connected to resistor 43 by means of a parallel combination of a diode 30 and a series-connected combination of rheostat 31 and capacitor 32. Resistor 43 is an emitter electrode biasing resistor for transistor 27. Capacitor 29 is assigned a value such that it charges to the noise signal peak at electrode 28 when diode 30 conducts. Diode 30 is poled to conduct on negative-going excursions of the noise signal at collector electrode 28. During positive-going excursions of the noise signal diode 30 is cut-off and presents a high impedance to reverse current. Capacitor 29 discharges through the rheostat 31 to charge capacitor 32 during the positive-going excursions of the noise signal thus reinforcing the charge on capacitor 32. Capacitor 32 discharges slowly through rheostat 31 and diode 30 so that peak signal value is substantially retained as charge on capacitor 32 from one signal envelope peak to a subsequent signal envelope peak during a selected time period in which envelope amplitudes complete a fluctuation. The selected time period is an envelop period. A rheostat tap 33 is used to set a predetermined nominal output signal value at a test set output terminal 34 for a known test set input reference signal as will be hereinafter described. During a dial test the detected signal amplitude at terminal 34 is positive in polarity with respect to power supply terminal 51 and is a function of the amplitude of the peak value of the envelope of the signal at collector electrode 28.

An output collector electrode 37 of transistor 35 is coupled to an average signal detection circuit for one polarity of a noise signal by means of a coupling transformer 36. An output winding 39 of transformer 36 is connected in a series loop with a diode 40 and a parallel combination of a capacitor 38 and a resistor 41. A terminal 46 of winding 39 and one terminal of each of the capacitor 38 and of the resistor 41 are connected to the power supply terminal 51. Transformer 36 has a stepdown turns ratio from input to output. The effect of this ratio together with the time constant of capacitor 38 and resistor 41 permit the mainenance of a volage drop across capacitor 38 and resistor 41 proportional in amplitude to the average value of one polarity of the noise signal envelope at electrode 37. The diode 40 is polarized such that it conducts when there is a positive-going signal at a terminal 45 of winding 39. Capacitor 38 and resistor 41 are selected so that the capacitor 38 charges slowly with respect to the envelope period of the noise signal at collector electrode 37 during diode 40 conduction. Capacitor 38 discharges at a rate which is approximately the same as the rate of the aforementioned charging. During a dial test the detected signal amplitude at terminal 42 is positive in polarity with respect to terminal 51 of the power supply and proportional in amplitude to the input signal envelope average value for one polarity of the input noise signal.

Before the test set can be used for testing telephone dials, the test set must be calibrated. Calibration of the test set assures that test data acquired through use of the test set is meaningful.

A single frequency signal in the frequency band between 3000 cycles per second and 10,000 cycles per second, having a uniform amplitude with respect to time and within the linear operating range of the test set, is introduced at the microphone 9. Tap 19′ is set at midrange. A direct current vacuum tube voltmeter 56 is placed across the output terminals 34 and 42. Tap 33 is adjusted until zero volts are measured on the voltmeter. This is the output which is expected for a theoretically perfect dial noise characteristic. Theoretical perfection of dial noise is attained by a dial which has a signal envelope at the output of amplifier 55 with equal average and peak values. After this measurement is completed, the test signal is removed from the test set.

A maximum tolerable departure of dial mechanism noise from the theoretically perfect dial is established. A tolerance mark 64 is placed on the scale of voltmeter 56 indicating the maximum acceptable departure. A dial is then placed in the chamber 8 and rotated. If the noise generated produces a reading on the voltmeter 56 below the tolerance mark 64, the dial is considered acceptable. If the noise generated produces a reading on the voltmeter 56 above the tolerance mark 64, the dial is considered unacceptable.

It will be recognized by those skilled in the art that the averaging circuit 65B can be designed to utilize the electrical characteristics of voltmeter 56. For this purpose capacitor 38 and resistor 41 are selected such that the detected signal amplitude at terminal 42 is positive in polarity with respect to terminal 51 and proportional in amplitude to the envelope of the input signal for one polarity of the input signal. The direct current vacuum tube voltmeter 56 is placed across terminals 34 and 42.

Calibration is accomplished as previously mentioned. The voltmeter 56 measures the difference between the envelope peak valve output and the envelope output. Since the voltmeter 56 responds to the direct current component for any fluctuating signal, it indicates the difference between the direct current components of the peak value at terminal 34 and the rectified envelope at terminal 42. The results of the operation just described are equivalent to the results of the operation of circuit 65B previously described wherein circuit 65B produced the average value of the rectified envelope at terminal 42.

The above detailed description is by way of illustration of one embodiment of the invention and it is understood that other embodiments thereof will be obvious to those skilled in the art. These additional embodiments are considered to be within the scope of the invention.

What is claimed is:

1. The combination in a detection device of:
   an input signal source,
   a first detector means having an output responsive to the peak value of a signal from said source,
   a second detector means having an output responsive to the average value of a signal from said source,
   said signal source being connected in multiple to said first detector means input and to said second detector means input, and
   means measuring output difference variations between said first and second detector outputs.

2. A combination in accordance with claim 1 in which said signal source comprises:
   a means supplying a diversity of input signals having a plurality of frequency bands,
   different ones of said input signals having significantly different amounts of energy within a predetermined one of said bands, and
   means differentially amplifying energy in said predetermined frequency bands relatively more than energy in others of said frequency bands.

3. A combination in accordance with claim 1 in which said signal source comprises:
   a mechanical noise generating means, and
   an acoustical to electrical transducer coupling said generating means to the inputs of said first and second detector means.

4. A combination in accordance with claim 3 in which said transducer includes means to amplify signal energy in one frequency band relatively more than in other frequency bands.

5. A combination in a detection device comprising:
   an input signal source,
   a first detector branch circuit producing an output signal which is a function of the envelope peak value of a signal from said source,
   a second detector branch circuit producing an output signal which is a function of the average value of a signal from said source,
   means connecting said signal source to the input of said first detector branch circuit and to the input of said second detector branch circuit, and
   means measuring output signal difference variations between said first and second detector outputs.

6. A combination in accordance with claim 5 in which said signal source comprises:
   means supplying a diversity of input signals having a plurality of frequency bands,
   different ones of said input signals having significantly different amounts of energy within a predetermined one of said bands, and
   means differentially amplifying energy in said predetermined frequency band relatively more than energy in others of said frequency bands.

7. A combination in accordance with claim 5 in which said signal source comprises:
   a mechanical noise generating means, and
   an acoustical to electrical transducer coupling said generating means to the inputs of said first and second detector means.

8. A combination in accordance with claim 7 in which said transducer includes means to amplify signal energy in one frequency band relatively more than in other frequency bands.

9. An apparatus for analyzing mechanically generated noise and comprising:
a device for mechanically generating noise,
a microphone acoustically coupled to said device,
a wave amplification means having an input electrically connected to said microphone and producing output signal wave fluctuations,
a first branch circuit connected to the output of said amplification means and comprising means to detect the peak value for one polarity of said signal wave fluctuations,
a second branch circuit connected to the output of said amplification means and comprising means to detect the average value of one polarity of said wave fluctuations, and
means measuring the difference between the output signals of said first branch circuit and the output signals of said second branch circuit.

10. A noise analyzer for telephone dials comprising:
a microphone,
a rotatable telephone dial which mechanically generates noise during rotation,
an acoustical chamber enclosing said microphone and acoustically coupling said noise to said microphone,
a differential gain characteristic amplifier producing output wave fluctuations, said amplifier having an input thereof connected to said microphone and having an output,
a first branch circuit connected to said amplifier output and comprising a peak value detector circuit responsive to one polarity of said output wave fluctuations,
a second branch circuit connected to said amplifier output and comprising an average value detector circuit responsive to one polarity of said output wave fluctuations, and
means measuring the difference between output wave fluctuations of said first and second branch circuits.

11. A noise analyzer in accordance with claim 10 in which characteristics of said microphone and amplifier complement each other such that said output wave fluctuations are characterized by emphasized amplification in a predetermined frequency band.

12. In combination:
means generating noise signals comprising fluid pressure undulations in a predetermined frequency range,
means converting said noise signals to an electric signal wave having amplitude variations corresponding to said undulations, said signal wave variations defining a wave envelope wherein the difference between envelope peak excursion and envelope average excursion is a measure of noise in said range, and
means measuring the difference between the magnitudes of said envelope peak and average excursions.

No references cited.

KATHLEEN H. CLAFFY, *Primary Examiner.*

A. A. McGILL, *Assistant Examiner.*